March 2, 1971     E. L. STERRETT     3,566,611
LIQUID PHASE LOW TEMPERATURE SWEETENING LNG
Filed March 9, 1968
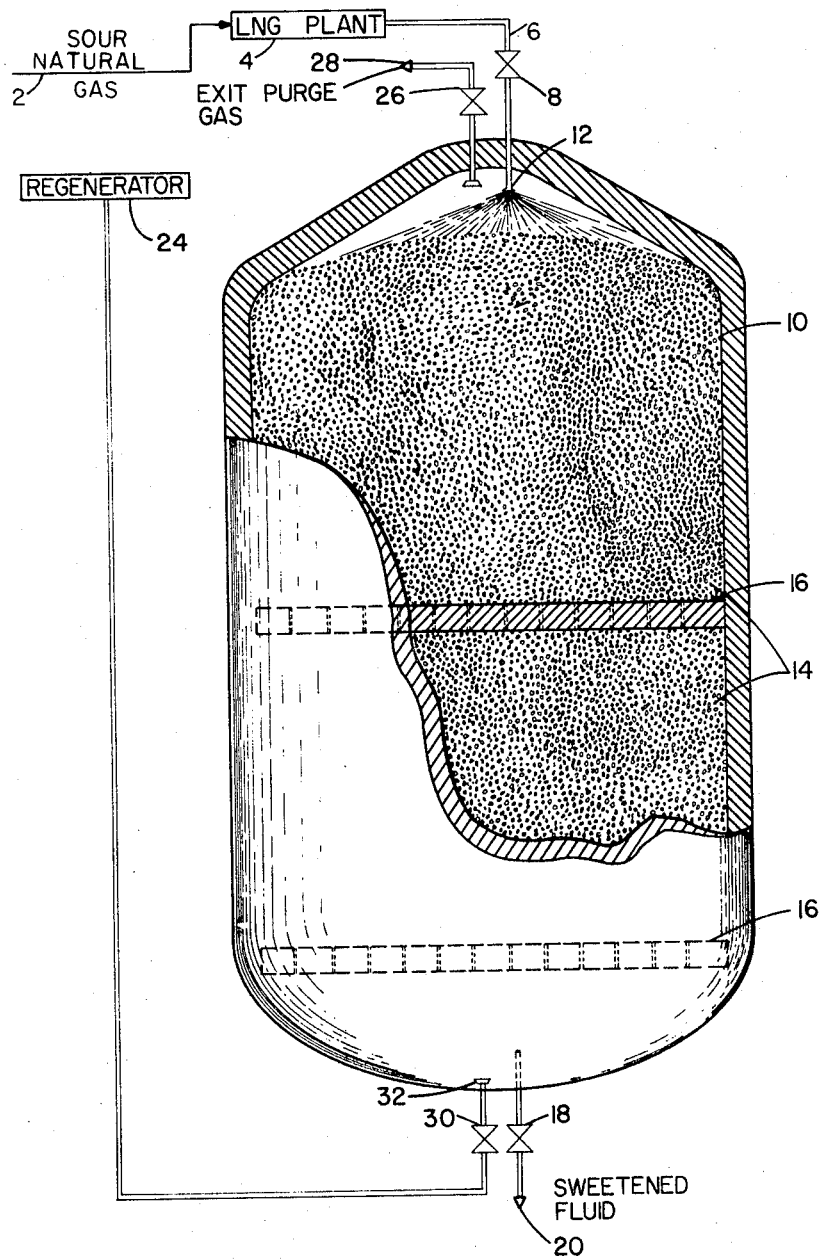
INVENTOR
E.L. STERRETT
BY:
ATTORNEY ial Office 3,566,611
Patented Mar. 2, 1971

3,566,611
LIQUID PHASE LOW TEMPERATURE SWEETENING LNG
Eugene L. Sterrett, Hacienda Heights, Calif., assignor to Marathon Oil Company, Findlay, Ohio
Filed May 9, 1968, Ser. No. 727,933
Int. Cl. F25j *3/00, 3/08*
U.S. Cl. 62—18         10 Claims

ABSTRACT OF THE DISCLOSURE

This process involves the liquid phase sweetening of natural gas comprising first liquefying the natural gas containing dissolved sulfur-containing compounds followed by removal of the sulfur-containing compounds from the liquefied natural gas effluent by adsorbing them on a molecular sieve. Substantially all of such impurities as hydrogen sulfide, organic sulfur compounds such as mercaptans, and non-organic compounds such as carbon dioxide are substantially removed by liquid phase adsorption on the molecular sieve.

BACKGROUND OF THE INVENTION

The field of this invention relates to the purification of natural gas by removal of impurities such as sulfur-containing compounds, primarily of which is hydrogen sulfide. Sulfur-containing compounds such as hydrogen sulfide, and other sulfides, disulfides, mercaptans, ring-type sulfur compounds and free sulfur are often found in varying amounts in natural gas. These compounds are generally corrosive in nature and case air pollution when burned with the natural gas. It is desirable to have them removed from the natural gas.

In the past, natural gas has been dried and sweetened (removal of hydrogen sulfide) in the vapor phase with molecular sieves such as is taught in U.S. 3,078,634 to Milton.

Kurata et al., in U.S. 2,901,326, separates hydrogen sulfide from a liquefied natural gas (LNG) stream by a two-phase separation process where the purified methane-containing vapor contains up to 0.1 mole percent hydrogensulfide. Further sweetening of the methane-rich gas is accomplished by amine scrubbing or by other conventional means. FIG. 4 in the drawings of the Kurata patent is helpful in relating the solubility of hydrogen sulfide in liquid methane at various temperatures.

SUMMARY OF THE INVENTION

This invention relates basically to a two-step process for the purification of methan-rich natural gas. The first step of the process involves liquefying the natural gas to form liquefied natural gas (LNG) comprising preferably from about 93.0 to about 99.98 mole percent hydrocarbon gases and preferably from about 7.0 to about 0.02 mole percent of sulfur-containing compounds. Minor amounts of other impurities such as carbon dioxide may be present. The second step of the process involves removing the sulfur-containing compound impurities from the liquefied natural gas by adsorbing these compounds on a zeolite packed bed or more preferably on a molecular sieve. The adsorbent is a crystalline mass containing inner-connecting cavities of substantially uniform size separated by narrow openings of substantially equal uniformity. Particularly, such compounds as hydrogen sulfide, because of its high polarity and small nuclear diameter, will be selectively adsorbed within the crystalline adsorbent to leave the effluent LNG substantially free from hydrogen sulfide.

Sweetening at low temperatures in the liquid phase, as in the present invention, has advantages over the vapor phase method, some of which are: first, a smaller bed of molecular sieve may be used to effect the proper mass transfer; secondly, appreciable amounts of water vapor do not interfere with the adsorbing process, since substantially all of it has been removed in the liquefaction step; thirdly, the molecular sieve vessel can be designed for lower pressure conditions; fourthly, the pressure drop across the molecular sieve vessel is less and; fifthly, more sulfur-containing compound impurities can be retained per unit weight of molecular sieve than in the gas phase sweetening procedure. Furthermore, lower temperatures can be utilized for the regeneration step.

BRIEF DESCRIPTION OF THE DRAWINGS

The accompanying figure is a flow diagram of a preferred embodiment of this invention. References to the drawing are made in the following description of the preferred embodiments. Reference number 10 designates a partial cutaway, partial schematic view of a molecular sieve bed.

DESCRIPTION OF THE PREFERRED EMBODIMENTS

In the practice of this invention, the first step of the process involves liquefying a natural gas stream 2 in any of the normally practiced methods for liquefying natural gas. For instance, natural gas can be liquefied using the standard cascade cycle, a dual-refrigerant cycle, or an auto refrigerated cascade cycle. It is important that the inlet stream 2 to the LNG plant 4 preferably contains not more than about 7.0 and more preferably not more than about 1.0 mole percent of sulfur-containing compounds for economic reasons but in particular this value would depend upon the operating pressure of the liquefaction plant utilized at the point of sulfur compound removal. Thus, in the standard cascade type LNG liquefaction plant, an inlet stream containing an excessive amount of sulfur-containing compounds would cause plating on the heat exchangers at temperatures below the solidification temperature of the sulfur compounds and cause insurmountable fouling problems. For most applications of this invention, the maximum allowed mole percent of sulfur-containing compounds influent 2 to the LNG plant 4 would be that amount soluble in the LNG below the solidification temperature of the sulfur compound. Just below the critical temperature of a representative LNG sample, up to 7.0 mole percent hydrogen sulfide may be tolerated. Thus, as an example, according to Kurata et al.'s FIG. 4 of U.S. 2,901,326 hydrogen sulfide is soluble in LNG to the extent of approximately 0.4 mole percent at −232° F.

The natural gas is liquefied 4 by cooling it in the range of from about −117° F. at 675 p.s.i.a. pressure to about −258° F. at 14.7 p.s.i.a. where in general, the final liquid natural gas product is stored at atmospheric pressure at about −258° F. It is transported in conduit 6 to packed bed 10 controlled by valve 8. It is preferable to contact the natural gas at the higher temperature and pressure level in the liquid phase in order to reduce the heat loss and refrigeration horsepower requirements. It would be necessary to return the LNG to the LNG plant 4 for subcooling before it can be stored at atmospheric pressure if it is sweetened at the elevated temperatures and pressures.

The second step of the process in the practice of this invention involves removing impurities, principally deleterious sulfur-containing compounds, from the LNG effluent stream 6 produced in the liquefaction plant 4. The impurities are preferably removed by adsorption on a molecular sieve 10, although certain natural occurring zeolites may also be used as adsorbents providing that their crystalline structure meets the requirements hereinafter set forth.

The principal impurity removed is hydrogen sulfide. Other compounds, if present in the LNG effluent stream 6, will be removed by the adsorbent 14 in the molecular sieve 10 if the compounds are small enough to enter the pore openings of the adsorbent crystalline structure and are relatively polar in nature, that is, that they have measurable dipole moments. Thus, sulfur-containing compounds such as certain mercaptans or other organic sulfur compounds, if present in the LNG stream 6, are adsorbed in the molecular sieve. Any carbon dioxide present in the effluent will also be adsorbed because of its polar nature and relatively small nuclear diameter. The carbon dioxide will only be adsorbed if there is adequate capacity in the crystalline structure after the sulfur compounds have been adsorbed. In general, the natural adsorption preference is in the following descending order: water; hydrogen sulfide; mercaptan; disulfide; carbon dioxide.

The molecular sieve adsorbents 14 useful for the present invention are crystalline, hydrated, metal alumino silicates characterized by the fact that the crystals contain innerconnecting cavities of substantially uniform size, separated by narrow openings or pores of substantially equal uniformity. Any of the type 4A, 5A, or 13X molecular sieves manufactured by the Linde Company or the Davison Company are operable molecular sieves useful for the present invention, although more preferably either Type 5A or 13X sieves are used. The 4A molecular sieves comprise hydrated sodium alumino silicates with pore openings of approximately 4.2 A. in diameter. The type 5A molecular sieve comprises hydrated calcium alumino silicates with pore openings of approximately 5A. in diameter. The type 13X molecular sieve comprises a hydrated sodium alumino silicate with a diamond-type crystalline structure with pore openings of approximately 8 to 10 A. in diameter.

Molecular sieves have the ability to selectively adsorb molecules on the basis of size and polarity. In the present invention, nearly all of the major impurity components of the LNG effluent 6 have critical diameters small enough to enter the pore openings of the crystalline structure of the adsorbent. The ability of the molecular sieve 10 to selectively adsorb hydrogen sulfide, carbon dioxide, and certain mercaptans and other organic sulfur-containing compounds, is based on the molecular sieve's high affinity for polar molecules. Thus, for example, hydrogen sulfide, which is polar in nature, will be selectively adsorbed into the pore opening of the crystalline structure of the adsorbent whereas the unpolar methane and other light alkanes present will not be adsorbed.

Other polar compounds that may be present in the LNG, such as minor amounts of water remaining from the liquefaction step, will be adsorbed. However, one of the advantages of sweetening at low temperatures in the liquid phase, as previously mentioned, is that the LNG plant 4 effectively removes substantially all of the entrained water. Thus, the adsorbent 10 will not be clogged with water molecules, and its capacity to adsorb compounds of sulfur and carbon dioxide will not be hindered.

The adsorption step is carried out at pressures high enough and corresponding temperatures low enough to prevent the formation of vapor pockets, preferably in the range of from about $-120°$ F. at 675 p.s.i.a. to about $-260°$ F. at 16 p.s.i.a. and more preferably at the higher temperatures and pressures, and most preferably at a temperature of $120°$ F. at 675 p.s.i.a. The temperature should be about five degrees Fahrenheit below the liquid saturation temperature at the prevailing pressure to prevent the formation of vapor. Valve 8 is opened and sour LNG feed 6 is passed downward through the molecular sieve bed 10, and sweet fluid 18 is recoverd as the effluent.

The impurities present in the LNG stream 6 are either completely removed or removed to the extent that their presence is nondetectable. In general there will be less than about 1.2 parts per million (p.p.m.) by volume impurities in the sweetened effluent 18 although usually the effluent 18 will contain less than about 0.8 p.p.m. by volume impurites.

The molecular sieve bed 10 will be designed in accordance with the feed rates of the LNG plant 4. If the plant 4 has a large output of LNG, possibily a plurality of molecular sieve beds will be needed. The single bed 10 of the drawing has a distribution sparger 12 to uniformly distribute, under pressure, LNG to the adsorbent 14. Two layers of adsorbent 14 are supported by permeable supports 16. The number of stacks of adsorbent needed will again be a function of the size of the operation. The diameter of the bed 10 will depend on the flow rate of influent, but the maximum rate should not exceed a 10 p.s.i. pressure drop across the bed and the minimum rate should be sufficient to cause turbulent flow across the bed or approximately a superficial velocity of 0.5 ft./min.

The volume of the adsorbent 14 in bed 10 will depend on an optimum balance between a reasonable lapse time between regeneration cycles and the concentration of impurities of the influent. The amount of impurity retained will depend on the exact molecular sieve used, but the Linde 5A can retain about 10 pounds of impurities per 100 pounds of molecular sieve.

The next step is regeneration 24 by removing the entrained sour particles in the molecular sieve bed. To accomplish regeneration valves 8 and 18 are closed and valves 30 and 26 are opened. The bed 10 is depressurized preferably to less than about 125 p.s.i.a. Higher regeneration pressures of about 400 p.s.i.a. are effective but require higher temperatures or higher gas rates. Any excess liquid in the bed 10 may be pumped out prior to desorption if desired. In regenerating the desorption step consists of passing hot purge gas up through distributor 32 at a rate of about 30 ft. per minute superficial velocity in the reverse direction of the sour LNG feed 6 through nozzle 12. Preferable purge gases include nitrogen, methane, and other gases inert with respect to the adsorbent. The exit gas, if methane for instance, may be used in the plant fuel system. The temperature of regeneration is generally in the range of from about 350° to about 600° F., depending on the regeneration pressure and the pore opening of the particular molecular sieve in use, although this temperature is not narrowly critical. The higher temperatures assure more complete regeneration. Generally, a 650° F. regeneration temperature is not exceeded to prevent damage to the molecular sieve. The lower temperatures remove the hydrogen sulfide and the higher temperatures the mercaptans. The regeneration gas requirement is preferably from about 15 to about 30 pounds per mole per 100 pounds of molecular sieve. It is generally desirable that the purge gas be dry, sweet, and contain no oxygen, since oxygen would react adversely with the hydrogen sulfide to form sulfur deposits in the sieve.

Once the bed 10 has been regenerated, the process is continued by closing valves 30 and 26, opening valves 8 and 18, pressurizing, etc., as described heretofore. The process must be performed on a batch basis. To assure continuous treatment generally three separate beds 10 are used; one in service; one regenerating; and the other cooling down from the regeneration temperature. On occasion, two beds will assure continuous operation if the bed in service has sufficient capacity to allow time for the other bed to be regenerated and cooled before the service bed requires regeneration.

It should be understood that the invention is capable of a variety of modifications and variations which will be made apparent to those skilled in the art by a reading of the specification and which are to be included within the spirit of the claims appended hereto.

What is claimed is:

1. A process for the removal of sulfur-containing compounds from natural gas to produce natural gas finally containing not more than about 1.2 p.p.m. by volume of a sulfur-containing compound or compounds comprising
    (1) liquefying natural gas containing not more than about 7.0 mole percent of a sulfur-containing compound or compounds by cooling the natural gas to a temperature in the range of from about —117° to about —258° F. at sufficient pressure to liquefy the gas and thereafter
    (2) removing the sulfur-containing compound(s) from the liquefied natural gas effluent by adsorbing them on a molecular sieve at a temperature of about —120° to about —260° F. at sufficient pressure to assure adsorption in the liquid phase.

2. The process of claim 1 wherein the sulfur-containing compound(s) are organic or inorganic sulfur-containing compound(s).

3. The process of claim 2 wherein the inorganic sulfur-containing compound(s) is hydrogen sulfide.

4. The process of claim 1 wherein the molecular sieve adsorbent comprise crystal-containing inner-connecting cavities of substantially uniform size separated by narrower openings with substantially equal uniformity.

5. The process of claim 1 wherein the process further comprises:
    (3) regenerating the molecular sieve by passing an inert hot purge gas through the molecular sieve to remove entrained sulfur-containing compounds.

6. A process for the removal of hydrogen sulfide from natural gas to produce natural gas finally containing not more than about 1.2 p.p.m. by volume hydrogen sulfide comprising:
    (1) liquefying natural gas containing not more than about 7.0 mole percent hydrogen sulfide by cooling the natural gas to a temperature in the range of from about —117° to about —258° F. at sufficient pressures to liquefy the gas and thereafter
    (2) removing hydrogen sulfide from the liquefied natural gas effluent by adsorption on a molecular sieve at a temperature of about —120° to about —260° F. at sufficient pressures to assure adsorption in the liquid phase.

7. The process of claim 6 wherein the molecular sieve adsorbents comprise crystals containing inner-connecting cavities with substantially uniform size separated by narrower openings with substantially equal uniformity.

8. The process of claim 6 wherein carbon dioxide in addition to hydrogen sulfide impurities is also removed from the liquefied natural gas by adsorption on a molecular sieve.

9. The process of claim 6 wherein the process further comprises:
    (3) regenerating the molecular sieve by passing an inert hot purge gas through the molecular sieve to remove entrained hydrogen sulfide.

10. A process for the removal of carbon dioxide from natural gas comprising:
    (1) liquefying natural gas containing not more than about 7.0 mole percent of a sulfur-containing compound or compounds by cooling the natural gas to a temperature in the range of from about —117° to about —258° F. at sufficient pressure to liquefy the gas and thereafter
    (2) removing the carbon dioxide from the liquefied natural gas effluent by adsorbing it on a molecular sieve at a temperature of about —120° to about —260° F. at sufficient pressure to assure adsorption in the liquid phase.

References Cited

UNITED STATES PATENTS

| | | | |
|---|---|---|---|
| 2,863,527 | 12/1958 | Herbert | 62—17 |
| 2,901,326 | 8/1959 | Kurata | 62—12 |
| 3,078,640 | 2/1963 | Milton | 55—75 |
| 3,126,264 | 3/1964 | Damsz | 62—18 |
| 3,257,812 | 6/1966 | Shaieviz | 62—18 |
| 3,327,489 | 6/1967 | Gaumer | 62—18 |
| 3,360,944 | 1/1968 | Knapp | 62—18 |
| 3,412,567 | 11/1968 | Smith | 62—18 |
| 3,470,677 | 10/1969 | Eck | 55—73 |

OTHER REFERENCES

Fails, J. C. and Harris, W. D., Practical Way to Sweeten Natural Gas, Oil & Gas Journal, July 11, 1960, vol. 58, No. 28.

WILBUR L. BASCOMB, JR., Primary Examiner

A. F. PURCELL, Assistant Examiner

U.S. Cl. X.R.

55—73, 75; 219—283

UNITED STATES PATENT OFFICE
CERTIFICATE OF CORRECTION

Patent No. 3,566,611          Dated March 2, 1971

Inventor(s) Eugene L. Sterrett

It is certified that error appears in the above-identified patent and that said Letters Patent are hereby corrected as shown below:

Column 1, line 33, "case" should read -- cause --.
Column 3, line 70, "120° F." should read -- -120° F. --.

Signed and sealed this 31st day of August 1971.

(SEAL)
Attest:

EDWARD M. FLETCHER, JR.           WILLIAM E. SCHUYLER, JR
Attesting Officer                 Commissioner of Patents